United States Patent [19]

Banks

[11] 4,349,954
[45] Sep. 21, 1982

[54] MECHANICAL BONDING OF METAL METHOD

[75] Inventor: Bruce A. Banks, Olmsted Township, Lorgin County, Ohio

[73] Assignee: The United States of America as represented by the United States National Aeronautics and Space Administration, Washington, D.C.

[21] Appl. No.: 210,632

[22] Filed: Nov. 26, 1980

[51] Int. Cl.$^3$ .................. B23P 3/00; B23P 25/00; B23P 11/00
[52] U.S. Cl. ................................ 29/458; 29/521; 403/282
[58] Field of Search ............. 29/458, 521; 250/492.2; 403/282; 350/292; 204/140, 298

[56] References Cited

U.S. PATENT DOCUMENTS

| | | | |
|---|---|---|---|
| 1,163,784 | 12/1915 | Skinner | 29/521 |
| 1,729,747 | 10/1929 | Palm | 29/521 UX |
| 2,050,993 | 8/1936 | Bush | 29/521 |
| 2,106,379 | 1/1938 | Newing | 29/521 |
| 3,058,394 | 10/1962 | Edlin | 350/292 |
| 3,131,471 | 5/1964 | Nieter | 29/521 |
| 3,324,544 | 6/1967 | Haller | 29/521 |
| 3,451,871 | 6/1969 | Bauer et al. | 156/244.16 |
| 3,562,142 | 2/1971 | Lamont, Jr. | 204/298 |
| 3,573,190 | 3/1971 | Bloom | 204/298 |
| 3,666,642 | 5/1972 | Alwan et al. | 204/140 X |
| 3,699,334 | 10/1973 | Cohen et al. | 250/492.2 |

Primary Examiner—Charlie T. Moon
Attorney, Agent, or Firm—Norman T. Musial; John R. Manning; Gene E. Shook

[57] ABSTRACT

This invention is directed to a method of joining the surfaces of two metal structures in a mechanical bond. The joining process can be performed in either art or vacuum. The metal surfaces of the structures 10 and 12 that are to be bonded are exposed to an ion beam 14 together with a target 18 of low sputtering yield material. This material deposits on the surfaces and creates sites of sputter resistance which evolve into peaks 20 of a cone like surface microstructure. The textured metal surfaces are arranged in face to face relationship and compressed together with plastic deformation which mechanically interlocks the cone 22. A large interface area is produced which minimizes thermal and electrical losses. Also, no electrical power or heat is required during metal joining.

10 Claims, 4 Drawing Figures

MECHANICAL BONDING OF METAL METHOD

ORIGIN OF THE INVENTION

The invention described herein was made by an employee of the United States Government and may be manufactured and used by or for the Government for governmental purposes without the payment of any royalties thereon or therefor.

TECHNICAL FIELD

This invention is directed to a method of joining two metal surfaces in a mechanical bond.

Various welding techniques have been previously used. Among these are arc welding, electron beam welding, spot welding, brazing, explosion bonding, ultrasonic welding, and vacuum cold welding.

The prior art techniques of metal joining require high temperatures or extremely clean surfaces that are oxide free.

BACKGROUND ART

U.S. Pat. No. 3,451,871 to Bauer discloses a process wherein a metal sheet is treated with an electric field to improve the adherance of a second material, such as adhesive or plastic film. The second material may also be a metal.

Cohen et al U.S. Pat. No. 3,699,334 is directed to a process wherein the metal surface is eroded by ion bombardment. These ions are preferably argon, and the process is used in surface shaping.

DISCLOSURE OF INVENTION

In accordance with the present invention, both metal surfaces to be bonded are ion textured by simultaneously sputtering them along with a lower sputtering yield material. A cone-like surface microstructure results as the sputtering process continues with the surfaces appearing as a close-packed nesting of micron or submicron length cones.

The two surfaces are then compressed together with plastic deformation of the cones. This causes the cones to buckle in random directions which permanently mechanically interlocks them. This results in the mechanical bonding of the two metal surfaces.

BRIEF DESCRIPTION OF THE DRAWINGS

Details of the invention will be described in connection with the accompanying drawings wherein.

BEST MODE FOR CARRYING OUT THE INVENTION

Figure 1:
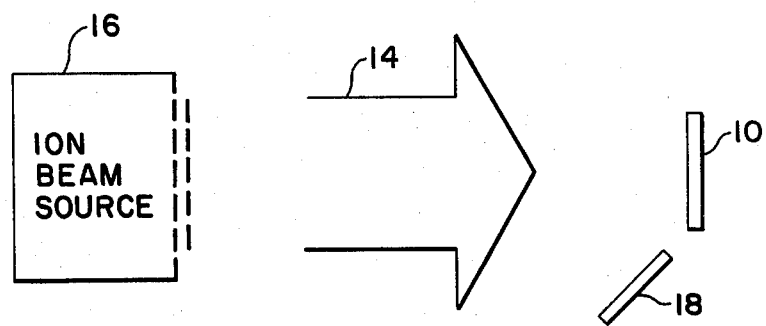
FIG. 1 is a schematic view of the ion beam texturing apparatus used to prepare the surfaces.

Referring now to the drawings there is shown in FIG. 1 apparatus for carrying out the method of the invention. More particularly, the metal surfaces of the structures 10 and 12 that are to be bonded are exposed to a beam 14 of 0.5 keV to 2 keV ions at ion current densities of 0.1 mA/cm$^2$ to 2.0 mA/cm$^2$.

The ion beam 14 is generated by a source 16. This ion beam source is preferably of an electron bombardment type developed from electric propulsion technology.

The ions in the beam 14 are preferably of an inert gas, such as argon. Such an ion source is described in "Advances in Electronics and Electron Physics" by H. R. Kaufman, vol. 36, pages 365-373. Beam extraction may be accomplished by a dished, two grid ion optics system of the type described in AIAA Paper No. 76-1017 entitled "A 30 cm Diameter Argon Ion Source". Neutralization of the ion beam 14 may be accomplished by secondary electrons released by ion bombardment of the facility in which the ion source 16 is mounted.

Along these lines the electron bombardment ion source 16 may be located in a vacuum facility which is sufficiently large to minimize back sputtered facility material from contaminating the surfaces of the structures 10 and 12. This vacuum facility is preferably maintained at a pressure of $4 \times 10^{-5}$ torr or lower during the operation of the ion source 16.

The surfaces of the structures 10 and 12 to be treated are positioned normal to the ion beam 14 at a location of about 5 to 15 centimeters from the ion source 16. The current density at such a location is about 1 mA/cm$^2$, and the beam 14 is substantially uniform over the surface being textured.

A target 18 of low sputtering yield material such as tantalum, tungsten, or molybdenum is also mounted in the vacuum chamber downstream from the ion beam source 16. The surface of the target 18 is at an angle of about 45° to the ion beam 14.

In operation, the surfaces of the metal structures 10 and 12 are ion beam textured by simultaneously sputtering these metal surfaces to be bonded and the lower sputtering yield material of the target 18. This lower sputtering yield material, in turn, deposits on the metal surface to be bonded and creates sites of sputter resistance.

These sites evolve into the peaks 20 of a cone-like surface microstructure as the sputtering process continues. These peaks 20 are shown in FIG. 2.

Figure 2:
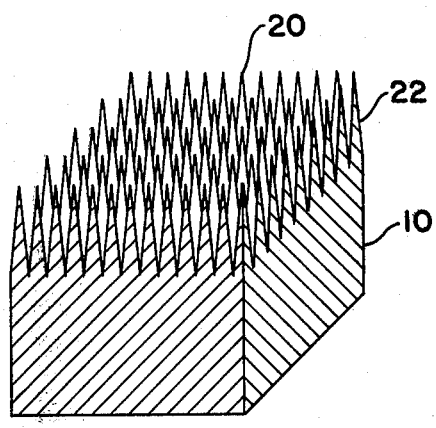
FIG. 2 is a perspective view of a portion of a surface that has been ion beam textured in accordance with the invention.
Figure 3:
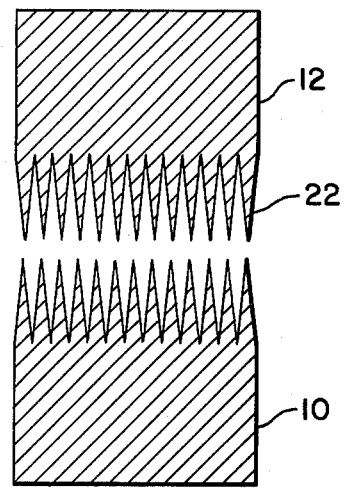
FIG. 3 is a sectional view of two metals prior to mechanical bonding.

The surfaces of the structures 10 and 12 that are to be bonded appear as close packed nestings of micron or submicron length cones 22 shown in FIGS. 2 and 3. Each cone has a large length to diameter ratio.

Figure 4:
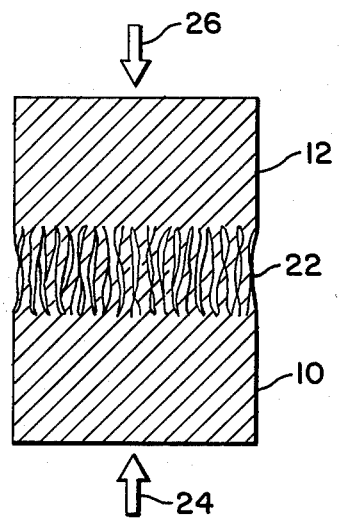
FIG. 4 is a sectional view of the metals after they are bonded.

The textured metal surfaces are arranged in face-to-face relationship as shown in FIG. 3 immediately prior to mechanical bonding. A compressive force then is applied to the structures 10 and 12 in the direction of the arrows 24 and 26. This force compresses the surfaces together with plastic deformation of the cones 22, as shown in FIG. 4. The plastic deformation of the cones 22 causes them to buckle in random directions. This permanently mechanically interlocks the cones 22 which results in the mechanical bonding of the two metal structures 10 and 12. The resulting mechanical bond is strongest in shear and weakest in tension because of the nature of the crushed cone structure.

The surfaces of several samples were ion textured, and the samples were bonded together in accordance with the method of the present invention. The mechanically bonded samples were tested in both tensile and shear as shown in Table I.

TABLE I

| Material | Bond Strength, psi | |
|---|---|---|
| | Tensile | Shear |
| Al to Al | 4 | 122 |

TABLE I-continued

| Material | Bond Strength, psi | |
|---|---|---|
| | Tensile | Shear |
| Cu to Cu | 33 | 83 |
| Al to Cu | 34 | 44 |

It is contemplated that any ductile material that is capable of being ion beam textured to a close nested cone structure can be bonded in accordance with the invention. As shown in Table I, dissimilar metals can be bonded together provided their microstructures are compatible for intertwining.

A large interface area is produced by this technique which minimizes thermal and electrical losses in comparison to spot welded metal joining techniques. Also, no electrical power or heat is required during the metal joining, and only pressure need be applied. By way of example, a simple hammer surfaces to bond the metals.

Very thin materials may be bonded easily by this technique. It is also evident that no environmental gas or vacuum requirements exist, and that the joining process can be performed in either air or vacuum.

While the preferred embodiment of the invention has been shown and described, it is contemplated that various modifications may be made to the invention without departing from the spirit thereof or the scope of the subjoined claims.

I claim:

1. A method of joining two surfaces in a mechanical bond comprising
    texturing said surfaces to form a plurality of close packed cones on said surfaces, and
    pressing said surfaces together with a force sufficient to cause plastic deformation of said cones whereby the cones buckle in random directions to permanently interlock them.

2. A method of joining two surfaces as claimed in claim 1 wherein the surfaces are metal and are textured by sputtering.

3. A method of joining two surfaces as claimed in claim 2 wherein the metal surfaces are simultaneously sputtered along with a lower sputtering yield material.

4. A method of joining two surfaces as claimed in claim 3 wherein the metal surfaces to be textured and the lower sputtering yield material are sputtered by
    placing the metal surfaces and a target of lower yield material in a vacuum environment of about $4 \times 10^{-5}$ torr, and
    exposing the metal surfaces and target to a beam of ions having an energy between about 0.5 KeV and 2 KeV and an ion beam current density between about 0.1 m/Acm$^2$ and 2 mA/cm$^2$.

5. A method of joining two metal surfaces as claimed in claim 4 wherein the beam comprises argon ions.

6. A method of joining two metal surfaces as claimed in claim 5 including providing a source of argon ions in the vacuum environment, and
    positioning the two metal surfaces in said beam of argon ions at a location between about 5 centimeters to about 15 centimeters from said source, both said metal surfaces being substantially normal to said beam.

7. A method of joining two metal surfaces as claimed in claim 6 including
    positioning the target in the vacuum chamber downstream from the ion source with the surface thereof at an angle of about 45° to the ion beam so that the lower sputtering yield material deposits on the metal surfaces and creates sites of sputter resistance.

8. A method of joining two surfaces as claimed in claim 1 wherein the textured surfaces have a close packed nesting of micron to submicron length cones, each cone having a substantially large length to diameter ratio.

9. A method of joining two surfaces as claimed in claim 8 wherein the surfaces are a metal selected from the group consisting essentially of aluminum and copper.

10. A method of joining two metal surfaces as claimed in claim 9 wherein the surfaces are sputtered along with a target of a metal selected from the group consisting essentially of tantalum, tungsten, and molybdenum.

* * * * *